United States Patent [19]

Church et al.

[11] Patent Number: 4,551,187
[45] Date of Patent: Nov. 5, 1985

[54] COPPER ALLOY

[75] Inventors: Nathan L. Church, Chagrin Falls; W. Raymond Cribb, Mentor; John C. Harkness, Lakewood, all of Ohio

[73] Assignee: Brush Wellman Inc., Cleveland, Ohio

[21] Appl. No.: 618,528

[22] Filed: Jun. 8, 1984

[51] Int. Cl.⁴ .......................... C22C 9/06; C22F 1/08
[52] U.S. Cl. .............................. 148/411; 148/12.7 C
[58] Field of Search .............................. 420/494, 490; 148/11.5 C, 12.7 C, 13.2, 160, 411, 432

[56] References Cited

U.S. PATENT DOCUMENTS

| | | | |
|---|---|---|---|
| 2,131,475 | 9/1938 | Hensel et al. | 420/494 |
| 2,139,497 | 12/1938 | Hensel et al. | 420/490 |
| 2,169,190 | 8/1939 | Kelly | 148/411 |
| 2,406,683 | 8/1946 | Hensel et al. | 148/160 |
| 4,179,314 | 12/1979 | Wikle | 148/160 |
| 4,425,168 | 1/1984 | Goldstein et al. | 148/160 |

FOREIGN PATENT DOCUMENTS 17534 of 0000 Japan .................................. 426/671

Primary Examiner—Peter K. Skiff
Attorney, Agent, or Firm—Eugene J. Kalil; Ewan C. MacQueen

[57] ABSTRACT

This invention is directed to age hardenable copper beryllium alloys, and to articles and parts made therefrom, which contain special small amounts of beryllium and cobalt; e.g., about 0.2% to about 0.5% beryllium and about 0.2% to about 0.4% cobalt, which, when finished by solution treating, cold working at least about 50% or at least about 70% and age hardening have a superior combination of stress relaxation resistance, formability, ductility, conductivity and strength.

2 Claims, 4 Drawing Figures

COPPER ALLOY

The present invention is directed to a new copper alloy containing small, interrelated amounts of beryllium and cobalt and to a method for processing the same to produce useful articles having an improved combination of stress relaxation resistance, formability, conductivity and strength.

BACKGROUND OF THE INVENTION AND THE PRIOR ART

Copper beryllium alloys have now been in commercial use for approximately fifty years and have a well-deserved reputation for being useful in many applications requiring high strength, formability, stress relaxation resistance and conductivity. A number of commercial copper beryllium alloys are known, including those bearing Copper Development Association designations C17500, C17510, C17000, C17200, C17300 as well as C81300, C82100, C82200 and C82400. These alloys contain varying amounts of beryllium and other alloying elements such as cobalt, nickel, silver, etc. In general, development of beryllium copper alloys has proceeded in the direction of providing premium performance, i.e., the highest strengths, best ductilities and the other highly desirable attributes of those alloys which are age-hardenable. Thus, U.S. Pat. Nos. 1,893,984, 1,957,214, 1,959,154, 1,974,839, 2,131,475, 2,166,794, 2,167,684, 2,172,639, 2,289,593 and 3,376,171 disclose various alloys containing varying amounts of beryllium and other elements. Various applications for such alloys are also discussed in the art. For example, spot welding electrodes are described in U.S. Pat. Nos. 1,957,214, 1,959,154 and 2,131,475. The latter patent sought to provide a satisfactory electrode with reduced amounts of cobalt and beryllium.

In the fifty or so years since the above-discussed patents were granted, whole new industries have appeared and new sets of requirements have been imposed on alloy producers. Thus, the requirements of the electronics and computer industries were unknown in the 1930's. Even the trends toward miniaturization in electronics and computers have arisen and proceeded at an accelerating pace only in the past few years. In the provision of spring-type connectors and contacts, the complexity of the devices needed, and the requirements for heat dissipation, as well as for survival of parts at elevated temperatures without failure due to stress relaxation, have proceeded apace. In addition, purchasers have become increasingly price-conscious and connector alloys such as the phosphor bronzes have been employed due to cost even though the inferior performance of such alloys, such as in poorer conductivity, poorer formability and lower stress relaxation resistance as compared to beryllium copper alloys, was known. Moreover, the formability requirements, which are of importance in the production of complex parts from strip or wire using progressive dies or other forming technologies, have elevated the difficulties imposed upon alloy suppliers as compared to the simpler days of U.S. Pat. No. 2,131,475 wherein the welding electrode described is merely a bar of wrought or cast metal which had to resist "mushrooming" under load, but with respect to which no formability requirement was imposed.

The property of stress relaxation is an important design parameter which can give the designer assurance that a particular contact or connector or like device will maintain the required contact pressure at elevated temperatures to assure long-life performance of an assembly including the device. Stress relaxation is defined as the decrease of stress at constant strain with time for a given temperature. From a knowledge of the stress relaxation behavior of a material, a designer can determine how much the room temperature spring force must be increased to assure a particular minimum force at operating temperature to maintain electrical contact between mating parts for an extended time period.

The stronger beryllium-containing age hardenable alloys such as C17200, which contains about 2% beryllium, are known to have high resistance to stress relaxation. On the other hand, the considerably cheaper phosphor bronzes, such as C51000 and C52100, which are not age hardenable and have to be severely cold worked to achieve high strength, are poor with respect to resistance to stress relaxation.

As used herein, stress relaxation resistance is determined by the test described in the paper entitled "Stress Relaxation of Beryllium Copper Strip In Bending" by Harkness and Lorenz presented at the 30th Annual Relay Conference, Stillwater, Oklahoma, Apr. 27-28, 1982. In accordance with this test, flat spring specimens having a contoured gage length are loaded in a fixture to a constant initial stress level and are exposed with the fixture in the stressed condition to an elevated temperature such as 300° F. (150° C.) for an extended time period. Periodically, a specimen is removed and measured to determine the amount of permanent set the material has undergone, from which the percent of remaining stress value can be calculated.

Formability is determined by bending a flat strip specimen, for example by 90°, about a punch having a nose of variable known radius with failure being taken as the point at which cracking occurs in the outer fibers of the bend. A rating is given for the test from the quantity R/t wherein "R" is the radius of the punch nose and "t" is the thickness of the strip. The rating can be used by designers to determine whether a particular material can be formed to the geometry desired in a particular part.

Technical papers dealing with copper beryllium alloys include: Rioja and Laughlin in *Acta Metallurgica*, Vol. 28, 1980; Laughlin and Tanner in *Bulletin of Alloy Phase Diagrams*, Vol. 2, No. 1, 1981; Guha, Alexander and Laughlin in "Metastable Precipitation in Ternary Cu—Ni—Be and Cu—Co—Be Alloys", presented at the TMS-AIME Fall Meeting, St. Louis, Mo., Oct. 25, 1982; and Chang, Neumann, Mikula and Goldberg in INCRA Monograph Series VI, 1979.

The invention provides an age hardenable copper beryllium alloy having a stress relaxation resistance closely approaching that of the strongest copper beryllium alloys of commerce together with high formability and ductility, high conductivity and useful strength, together with a previously unknown metallurgical structure.

SUMMARY OF THE INVENTION

Figure 1:
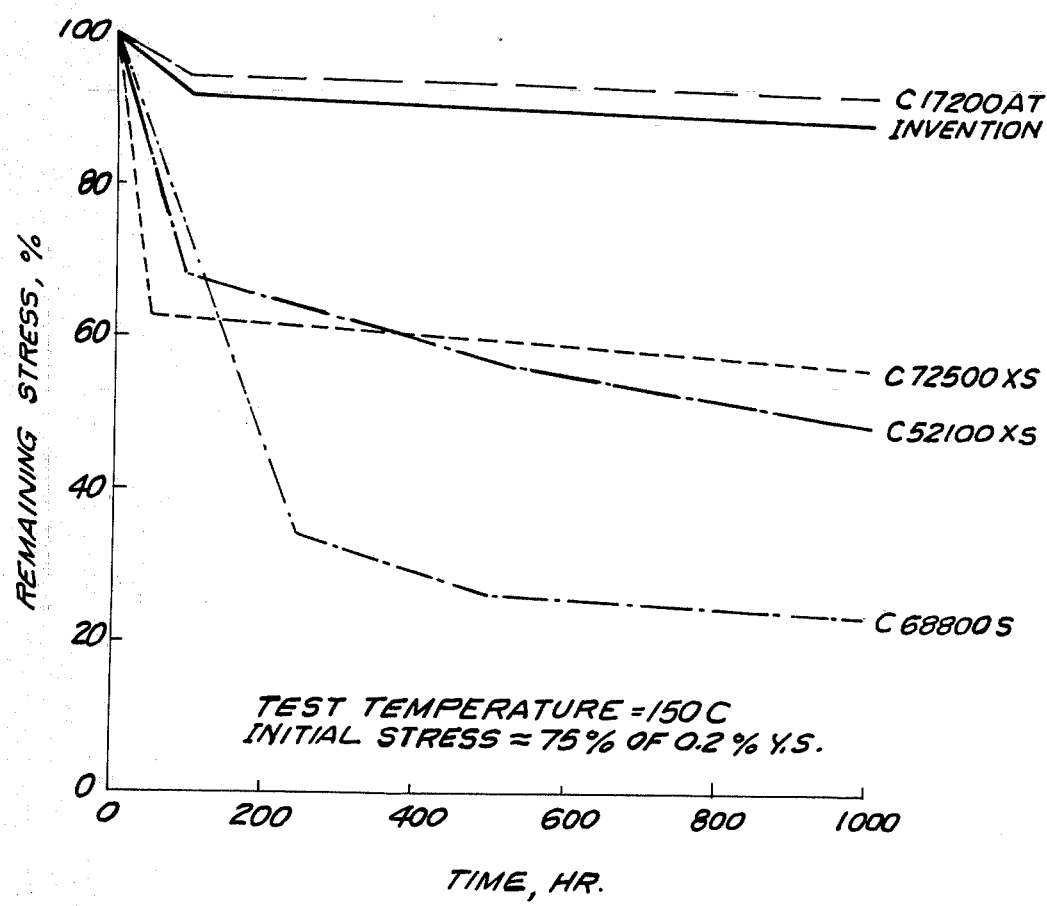
FIG. 1 depicts the stress relaxation curve at a temperature of 300° F. (150° C.) and an initial stress of 75% of the 0.2% offset yield strength for an alloy within the invention containing 0.3% Be and 0.25% Co, balance Cu. Data for other prior art materials, copper alloys C17200, C52100, C68800 and C72500, are included for comparison.
Figure 2:
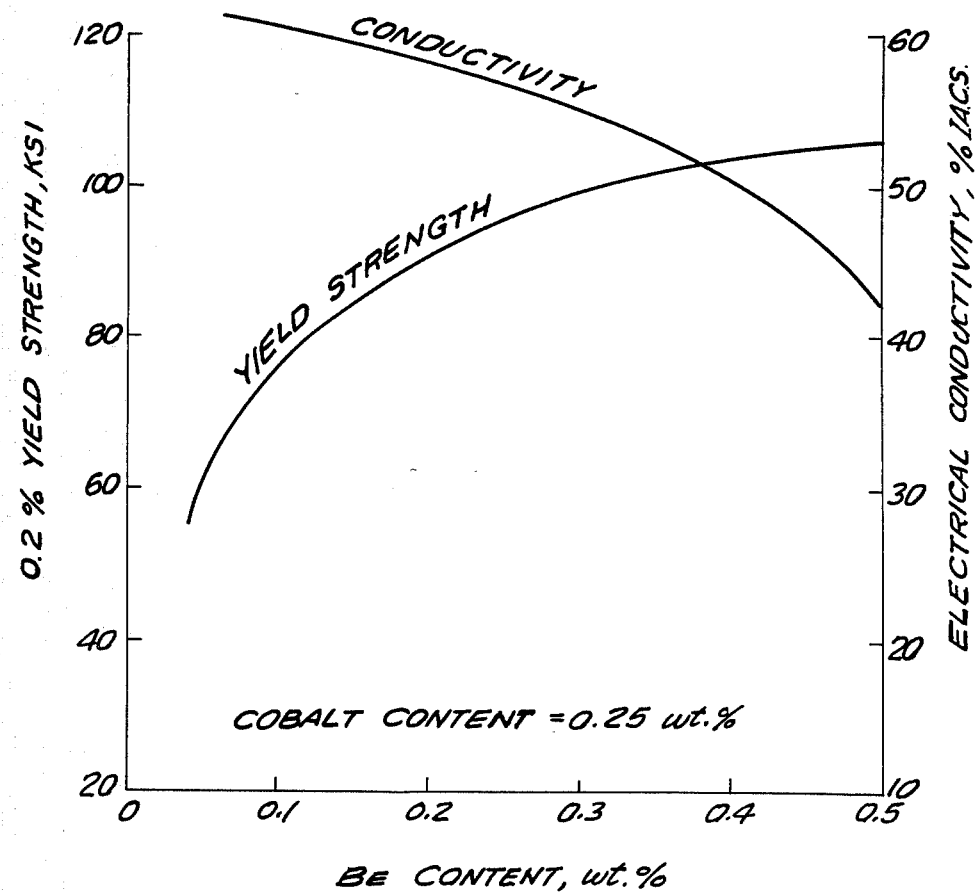
FIG. 2 depicts graphically the effect on electrical conductivity and 0.2% offset yield strength of increasing beryllium contents within the range claimed herein at a cobalt content of 0.25%.

The invention is directed to a copper beryllium alloy containing about 0.2% to about 0.5% beryllium, about 0.2% to about 0.4% cobalt and the balance essentially copper. The alloy is subjected to a working schedule in which the last working step is performed cold to effect a reduction of at least about 50%, and preferably about 70% to about 90%, followed by an aging treatment performed below about 900° F. (480° C.), e.g., about 700° F. (370° C.) to about 800° F. (425° C.).

DETAILED DESCRIPTION OF THE INVENTION

Alloys in accordance with the invention are readily workable both hot and cold. The alloys are characterized by a combination of properties including high stress relaxation resistance, high formability and ductility, high conductivity and useful strength. Thus an exemplary alloy containing about 0.3% beryllium, about 0.25% cobalt, balance essentially copper, initially stressed to 75% of its 0.2% offset yield strength, was found to have an 88% "stress remaining" value after 1000 hours exposure to stress relaxation at 300° F. (150° C.). The alloy was also found to resist softening when exposed for one hour to temperatures up to 750° F. (400° C.), tensile strengths of about 95 ksi (655 MPa) to about 125 ksi (860 MPa), elongations of about 5 to about 15%, conductivities of about 40% to about 65% I.A.C.S. and a "stress remaining" after 1000 hours at 300° F. (150° C.) in the stress relaxation test of at least about 85% of an initial stress equal to 75% of the 0.2% offset yield strength. In comparison, non-agehardenable strip (e.g., phosphor bronze alloy C51000) at about the same strength level displays a "remaining stress" value not exceeding 37% in the stress relaxation test for 1000 hours at 300° F. (150° C.), an elongation not exceeding 5%, formability (R/t) values of about 2.5 longitudinal and about 9 transverse, with a conductivity of only about 15% I.A.C.S.

The alloy of the invention is produced by casting using conventional static, semi-continuous or continuous means into suitable ingot or slab form, hot and/or cold working the casting, with or without in-process annealing operations, to a wrought product form sized to permit final cold reduction by a predetermined amount to desired finish dimension, solution annealing the wrought form at a temperature of about 1400° F. (760° C.) to about 1750° F. (955° C.) for a time sufficient to effect recrystallization and solid solution of that portion of the alloying elements contributing to subsequent precipitation hardening; cold working the solution treated alloy at least about 50% or preferably about 70% to about 95% reduction in area; and heat treating the cold worked alloy at a temperature in the range of about 600° F. (315° C.) to about 1000° F. (540° C.), preferably about 700° F. (370° C.) to about 800° F. (425° C.), e.g., 750° F. (400° C.), for less than about 1 to about 5 hours to effect precipitation hardening with accompanying substantial increase in resistance to stress relaxation, formability and ductility along with increased strength and conductivity. It should be borne in mind that solution treating temperatures exceeding about 1600° F. (870° C.) may produce undesirable grain growth in some alloys within the claimed range.

Alloys in accordance with the invention and their properties when tested as strip annealed at 1650° F. (900° C.), cold rolled 72% and aged at 750° F. (400° C.) for 3–5 hours are set forth in the following table.

| Alloy | % Be | % Co | 0.2% YS ksi | (MPa) | UTS ksi | (MPa) | Elong. (%) | Elec. Cond. (% IACS) | 90° Bend (R/t) L-T | Remaining Stress (%) |
|---|---|---|---|---|---|---|---|---|---|---|
| 1 | 0.14 | 0.20 | 67.5 | (465) | 79.7 | (550) | 14.2 | 61.0 | — | — |
| 2 | 0.50 | 0.25 | 94.2 | (650) | 105.4 | (725) | 8.4 | 39.7 | 1.0–9.0 | 88 |
| 3 | 0.41 | 0.25 | 93.0 | (640) | 101.4 | (695) | 10.0 | 41.7 | — | — |
| 4 | 0.31 | 0.25 | 90.0 | (620) | 98.3 | (675) | 8.0 | 47.3 | 1.25–4.4 | — |
| 5 | 0.29 | 0.26 | 89.1 | (615) | 99.9 | (690) | 9.6 | 51.3 | 0.5–1.6 | 88 |
| 6 | 0.30 | 0.49 | 111.6 | (770) | 118.5 | (815) | 7.7 | 50.2 | 0.4–2.6 | — |

(400° C.). The alloy was tested as heavily cold worked (72% to 96% reduction by rolling) strip which had been solution annealed at 1650° F. (900° C.) prior to cold work and aged at 750° F. (400° C.) for 3 hours after cold work. As 72% cold worked and aged strip, the alloy gave formability values (R/t) of 0.5 longitudinal and 1.6 transverse, with a tensile elongation of 9.6% in a 2 in. (50 mm) gage length. Conductivity was 51.3% I.A.C.S. Yield strength was about 89.1 ksi (615 MPa) and ultimate tensile strength was about 99.9 ksi (690 MPa). This combination of properties is typical of alloys within the invention which, when processed in accordance with the invention, will generally have 0.2% offset yield strengths on the order of about 85 ksi (580 MPa) to about 120 ksi (825 MPa), tensile strengths of about 95 ksi "L" and "T" 90° bend data represent formability in, respectively, the longitudinal and transverse rolling directions. Remaining stress is that portion of an initial stress of 75% of the 0.2% yield strength remaining after 1000 hrs. at 300° F. (150° C.).

Figure 3:
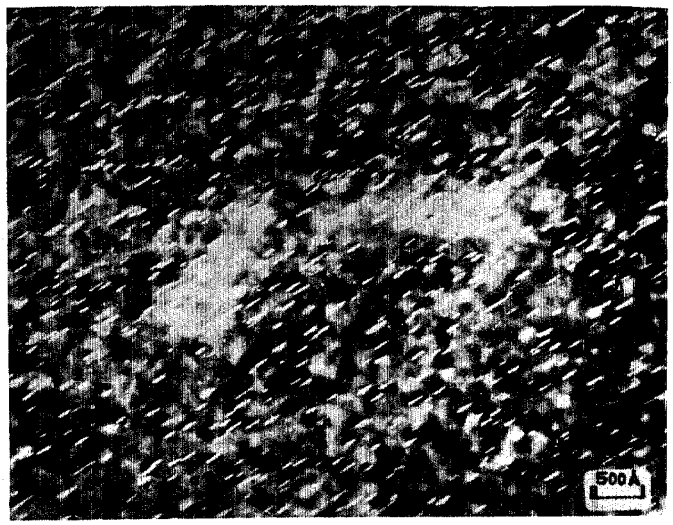
FIG. 3 is a transmission electron micrograph at 20,000X magnification of an alloy within the invention, containing 0.3% Be and 0.5% Co, solution annealed at 1650° F., water quenched and aged 5 hours at 950° F. to reveal the principal hardening phase as a profuse number of disc-shaped particles, identified as γ" precipitates by electron diffraction analysis.
Figure 4:
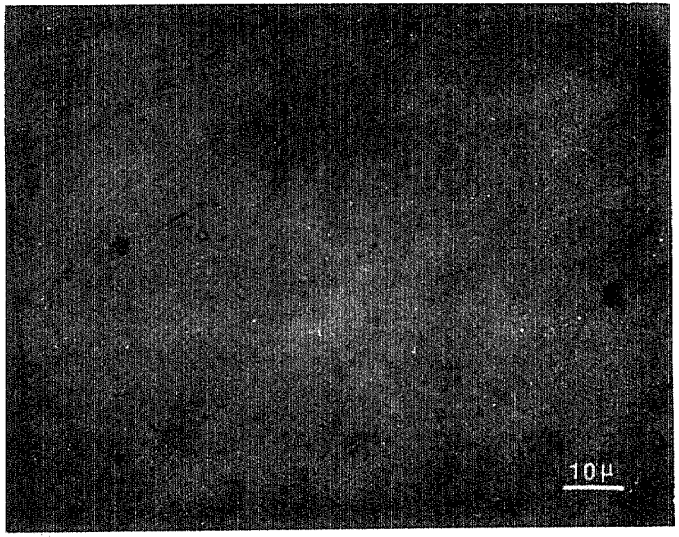
FIG. 4 is an optical photomicrograph at 1000X magnification of an alloy within the invention, containing 0.3% Be and 0.25% Co, showing only a few small intermetallic cobalt-beryllide particles in the matrix.

Alloys within the invention are characterized by the transmission electron and optical microstructures, respectively, of FIGS. 3 and 4. These alloys are distinctly different from copper-cobalt-beryllium alloys of the prior art in that they exhibit, when age hardened, a substantially greater density of principal hardening precipitates and fewer and smaller cobalt-beryllide intermetallic particles than alloys higher in cobalt content. For example, an alloy containing 0.3% beryllium and 0.5% cobalt annealed at 1650° F. (900° C.) and aged at 950° F. (510° C.) to intentionally enlarge the principal hardening precipitates for detection exhibits a particle density on the order of $2.3 \times 10^9$ precipitates per square millimeter in a transmission electron microscope thin foil, and only about 240 cobalt-beryllium intermetallic particles of at least 0.0001 inch (2.5 micron) diameter per square millimeter in an optical metallographic specimen, whereas, commercial alloy C17500 containing nominally 0.5% beryllium and 2.5% cobalt and similarly heat treated was found to exhibit on the order of about a 20-fold lower density of hardening precipitates, and about an 8-fold increase in the density of intermetallic particles.

Beryllium content is maintained within the limits of the invention to retain high electrical conductivity and minimize manufacturing cost. The cobalt range is established by a minimum amount necessary to remain in solution to effect age hardening by shifting metastable solvi to higher temperatures, and an upper limit beyond which beryllium otherwise available for age hardening, is increasingly depleted from the matrix to form cobalt-beryllide intermetallic particles which do not contribute to strengthening. Alloys in accordance with the invention are thus capable of achieving strength within the limits cited for cold worked and aged copper-cobalt-beryllium alloys of the prior art, e.g., C17500 in the HT temper, 37% cold rolled and aged 2 hrs at 900° F. (480° C.), having an ultimate tensile strength of 100-120 ksi (690-825 MPa), but at less than about one-fifth the cobalt content.

Alloys of the invention may be used in wrought forms for current-carrying springs, mechanical springs, diaphragms, switch blades, contacts, connectors, terminals, fuse clips, bellows, die casting plunger tips, sleeve bearings, tooling to mold plastics, oil/coal drilling equipment components, resistance welding electrodes and components. The alloys may also be suitable for lead frames. They are readily platable and suitable for inlays.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A copper-beryllium alloy consisting essentially of about 0.2% to about 0.5% beryllium, about 0.2% to about 0.5% cobalt and the balance essentially copper which has been solution treated at a temperature not exceeding about 1750° F., then cold worked at least about 70% and aged in the temperature range of about 700° F. to about 800° F. for about 1 to about 5 hours and which has a Percent Remaining Stress of at least about 85% after 1000 hours of stress relaxation testing at 300° F. at an initial stress of 75% of the 0.2% offset yield strength, a formability not exceeding 1.25 in the longitudinal bend test, a tensile strength of about 95 to about 125 ksi (655 to 860 MPa), 0.2% offset yield strength of about 85 to about 120 ksi (580 to 825 MPa), elongations of about 5% to about 15% and conductivity of about 40% to about 65% I.A.C.S. and by a microstructure, in the condition resulting from an anneal at 1650° F. followed by an age at 950° F., exhibiting a particle density of the principal hardening precipitates of about $2.3 \times 10^9$ precipitates per square millimeter in a transmission electron microscope thin foil, and only about 240 cobalt-beryllium intermetallic particles of at least 2.5 microns diameter per square millimeter in an optical metallograph.

2. An alloy in accordance with claim 1 wherein said beryllium content is about 0.25% to about 0.5% and said cobalt content is about 0.25%.

* * * * *